United States Patent [11] 3,627,696

[72] Inventors Joseph J. Heithaus
Florissant;
Oscar M. Muskopf, St. Louis, both of Mo.;
Gedeminas J. Reinis, Rochester, N.Y.;
Clarence L. Mahoney, Berkeley, Calif.

[21] Appl. No. 855,438
[22] Filed July 9, 1969
[45] Patented Dec. 14, 1971
[73] Assignee Shell Oil Company
New York, N.Y.
Original application Dec. 27, 1965, Ser. No. 526,318, now abandoned. Divided and this application July 9, 1969, Ser. No. 855,438

[54] POLYPHENYL ETHER SOLDERING FLUID
5 Claims, No Drawings

[52] U.S. Cl. .......... 252/404, 252/57, 252/182, 260/611.5, 260/613 R
[51] Int. Cl. .......... C07c 41/12
[50] Field of Search .......... 252/404, 57, 182; 260/611.5, 613 R

[56] References Cited
UNITED STATES PATENTS
3,379,771 4/1968 Irick et al. .......... 260/611.5
3,423,469 1/1969 Hatton et al. .......... 260/611.5

*Primary Examiner*—Richard D. Lovering
*Assistant Examiner*—Irwin Gluck
*Attorneys*—Robert C. Clement and Harold L. Denkler

ABSTRACT: Polyphenyl ether-based fluids having improved stability and oxide solubilizing properties consisting essentially of polyphenyl ethers and a minor amount of a mixture of carboxylic acid derivatives of polyphenyl ethers.

POLYPHENYL ETHER SOLDERING FLUID

This application is a division of copending application, Ser. No. 526,318, filed Dec. 27, 1965 and now abandoned.

This invention relates to polyphenyl ether-based fluids and to the use of these fluids for protecting solder baths from oxidation.

In commercial soldering applications, it is often necessary to maintain a bath of solder at a high temperature for a relatively long time. Large solder baths are frequently used when it is desirable to solder a large number of joints at one time, such as for printed electrical circuits. Common methods of simultaneously soldering multiple connections are "dip soldering," and "wave" or "fountain" soldering. In dip-soldering operations, the units to be soldered are simply dipped for an appropriate length of time (usually less than 10 seconds) into a bath of molten solder. Dip-soldering units may vary widely in size, from small electrically heated pots holding about 5 pounds of solder, to gas-heated pots of 5 tons or larger used to solder, e.g., auto radiators. Wave soldering is similar to dip soldering except that a uniform wave of solder is continuously and slowly pumped up to crest in a wave above the level of the bath; units to be soldered may be passed through the wave of solder at a predetermined rate to insure proper contact. These soldering methods provide remarkable advantages for printed electrical circuits, allowing simultaneous soldering of several dozens or even hundreds of joints. In some cases, the solder may itself replace electrical wiring; molten solder is caused to preferentially wet certain areas of a circuit board which have been previously etched between electrical components. These soldering methods have provided great economic and time savings over conventional hand-soldering practices.

In each of these methods of multiple soldering, it is necessary to have available a large bath of solder at high temperatures, generally above 450° F. At these temperatures, solder (which is usually a mixture of lead and tin) oxidizes rapidly in the presence of air, resulting in the formation of insoluble oxides (called "dress") on the surface of the solder. To attain proper soldering, these oxides must continually be removed from the bath surface; otherwise, solid particles would be included in the joint, impairing mechanical strength and reducing or completely eliminating electrical conductivity. In the case of printed electrical circuits, even a very tiny particle could break a circuit connection.

In order to guard against formation of dress on the surface of the solder bath, it is common to cover the surface of the solder with a relatively inert fluid (herein referred to as a "soldering oil" or "soldering fluid"). A good soldering oil must be relatively stable in the presence of molten metal and air at both temperature, and must be capable of solubilizing oxides as they form. While petroleum-based oils have been generally satisfactory at temperatures of 500°–550° F., their useful lives decrease rapidly with increase in temperature from about 8 hours in a typical application at 500°–550° F. to only 2–4 hours at 700° F. While temperatures below 550° F. are suitable for many soldering operations, higher temperatures are necessary in some cases. For example, electrical wires used on printed circuit boards are insulated with a lacquer or a synthetic material, such as polyurethane; if this insulation could be removed (decomposed, dissolved, or volatilized) in the soldering step, a separate removal procedure would be obviated. Typical insulation is removed by heat in about 7 seconds at 650° F., 3 seconds at 700° F., and 1.5 seconds at 800° F. However, solder contact times of more than about 2 seconds might damage components on the printed circuit board, and therefore a successful fluid should operate at about 750° F. or higher for reasonable periods of time. No soldering oils known in the art have useful lives of more than a few hours at these temperatures. Also, operation at higher temperatures may be necessary when higher melting point solders (e.g., solder with high lead contents) are used.

It has now been discovered that a soldering oil for use at high temperatures comprises a polyphenyl ether base oil and a minor amount up to about 50 percent by weight of a mono- to tribasic acid derived from an unsubstituted polyphenyl ether having three to six rings. Oils of the invention have useful lives up to five times as long as presently available hydrocarbon-based oils. These oils have very good oxidation and thermal stabilities at operating temperatures, and are excellent scavengers for metal oxides which form in the solder.

The additives used to provide dispersant properties to the polyphenyl ether oil are polyphenyl ethers having from three to about six aromatic rings substituted with a total of from one to three carboxyl groups. These compounds are novel compounds and are represented by the following formula:

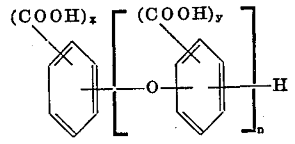

where $n$ is an integer from 2 to 5, $x$ is 0–3, $y$ is 0–3, and the sum of $x$ and $y$ in from 1 to 3. The integer $y$ may be different for each aromatic ring, as long as the total of $y$'s do not exceed about 3. Acids having fewer than three aromatic rings are generally too volatile for high temperature applications and are also insufficiently soluble in the base oil. Preferred acids have four to six aromatic rings, preferably five rings. There are at least one, preferably from one to three carboxyl groups per molecule, more preferably one or two; an increasing number of acid groups increases the solubilizing capacity of the oil for lead and tin compounds. A mixture of acids having an average of one to two carboxyl groups per molecule is especially appropriate. Use of more than about three acid groups per molecule reduces the solubility of the lead and tin salts of the acid in the base stock; more than three groups may be used on larger molecules but somewhat inferior results would be obtained. These compounds are present in the oil in amounts sufficient to increase the solubilizing capacity of the oil for metal oxides. Beneficial results are achieved when the additive is present in concentrations as little as 1 percent by weight of the final composition; more satisfactory results are achieved at concentrations of 3–50 percent by weight, preferably 5–30 percent by weight, of additive. Concentrations of 10–15 percent by weight are especially preferred. Either single compounds or a mixture of compounds having different numbers of aromatic rings per molecule, different numbers of carboxyl groups per molecule, different arrangement of carboxyl groups (i.e., ortho, meta, or para) may be used. The type of phenylene linkage is not critical and does not effect the essential properties of the acid. In addition, other additives such as antioxidants may be used if desired.

The polyphenyl ether carboxylic acids of the invention also have other uses besides soldering oil additives. They may also be used in many other applications where stable organic acids are required. For instance, they may be reacted with alcohols to make esters which are useful, e.g., as lubricants, or to make salts of the acids and transition metals which are useful as oxidation inhibitors.

Some specific examples of acids which are used either alone or in admixture as additives of the invention are:

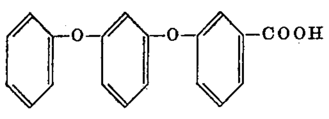

m=(m-carboxyphenoxy) phenoxy benzene

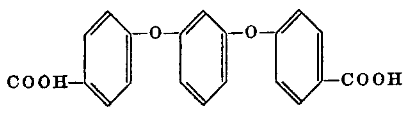

m-bis(p-carboxypehnoxy) benzene

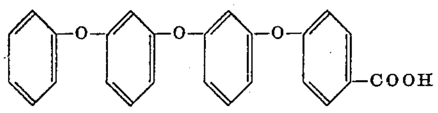

3-(p-carboxyphenoxy)-3'-phenoxy diphenylether

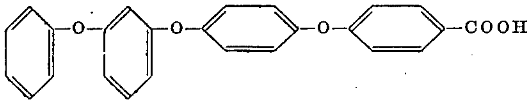

4-(p-carboxyphenoxy)-3'-phenoxy diphenylether

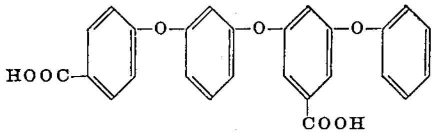

3-phenoxy 5-carboxy-3'-(p-carboxyphenoxy) diphenyl ether

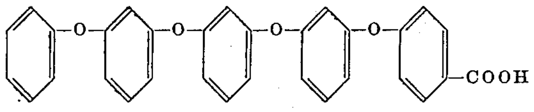

m[m-(p-carboxyphenoxy)phenoxy](m-phenoxy)phenoxy benzene

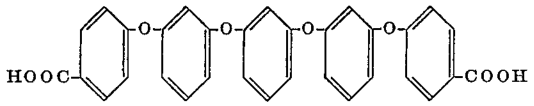

m-bis[m-(p-carboxyphenoxy)phenoxy]benzene

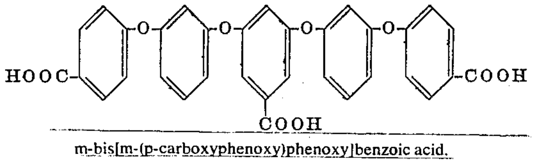

m-bis[m-(p-carboxyphenoxy)phenoxy]benzoic acid.

Mixtures of different compounds are preferred, since they are generally much easier to prepare from commercially available starting materials.

The polyphenyl ether base oils of the invention are well-known, commercially available oils. Polyphenyl ethers suitable for use as high-temperature soldering oils have from four to about eight aromatic rings per molecule. Oils having at least five rings, preferably five to seven rings, are preferred since compounds having less than five rings are too volatile at temperatures of 700° F. and above. Suitable base lubricants are compounds or mixtures of compounds having the following formula

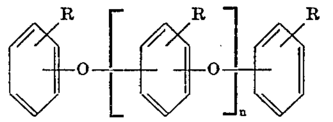

where $n$ is an integer from 2 to about 6, preferably 3 to 5, and R is hydrogen, $C_1$–$C_4$ alkyl, or a mixture thereof. The R's need not be the same; however, especially preferred compounds are unsubstituted ethers (R being hydrogen) of the formula

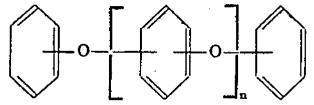

where $n$ is as defined above. Unsubstituted polyphenyl ethers, although somewhat higher melting, have oxidative and thermal properties superior to the corresponding substituted compounds.

Either a single polyphenyl ether compound or a mixture of compounds may be used as a base soldering oil according to the invention. These mixtures may be mixtures of compounds having different numbers of rings per molecule, or mixtures of isomers of compounds having the same number of rings per molecule. Mixtures are preferred, since they generally have lower melting points and lesser tendencies to crystallize. Metalinked compounds, or mixtures having a high proportion of meta linkages, e.g., ether mixtures in which at least about 50 percent of the phenylene radicals are meta-phenylene, are especially preferred since these compounds are lower melting than corresponding ortho- and paralinked compounds. Isomeric mixtures of unsubstituted ethers having five and six rings per molecule are commercially available. Examples of particularly preferred polyphenyl ether mixtures for use as base oils of the invention are as follows:

Composition I

| Constituent | %Wt |
|---|---|
| m-bis(m-phenoxyphenoxy)benzene | 60 |
| p-bis(m-phenoxyphenoxy)benzene | 35 |
| o-bis(m-phenoxyphenoxy)benzene | 5 |

Composition II

| Constituent | %Wt. |
|---|---|
| m-bis(m-phenoxyphenoxy)benzene | 65 |
| 1-(m-phenoxyphenoxy)-3-(p-phenoxyphenoxy)benzene | 28 |
| p-bis(m-phenoxyphenoxy)benzene | 7 |

Examples of preferred unsubstituted polyphenyl ether compounds to be used alone or in admixture with other compounds are bis(m-phenoxyphenyl) ether, m-phenoxyphenyl-p-phenoxyphenyl ether, m-bis(m-phenoxyphenoxy benzene, p-bis(m-phenoxyphenoxy)benzene, o-bis(m-phenoxyphenoxy)benzene, bis[m-(m-phenoxyphenoxy]ether, bis[p-(m-phenoxyphenoxy)-phenyl]ether, bis[p-(p-phenoxyphenoxy)phenyl] ether, and m-bis[m-(m-phenoxyphenoxy)phenoxy] benzene. Polyphenyl ether lubricants and their preparation are discussed in detail in Chapter 11 of Synthetic Lubricants (Gunderson and Hart, Ed), Reinhold Publishing Co., 1962.

In the absence of the acid additive of the invention, polyphenyl ether oils are very poor soldering fluids at any temperatures. At 700° F., sludge accumulates rapidly in the oil and after 1½ to 2 hours, excessive quantities of oxide appear in the solder, prohibiting proper operation. Incorporation of 10–20 %wt. polyphenyl ether dicarboxylic acid in the polyphenyl ether fluid increases the useful life at 700° F. to over 11 hours.

To demonstrate the excellent performance characteristics of fluids of the invention, several oils were tested for useful life in a Hollis "Peewee" Wave soldering unit. Oil was floated on top of the molten solder in the pot, and was also mixed in with the solder and pumped up through an elongated nozzle with the solder to form a fountain or wave of solder. Useful life of the oil was determined by appearance of insoluble oxides in the soldering wave. Polyphenyl ether fluids were tested with and without the acid additive, and were compared with a commercial wave-soldering oil consisting of a mineral base and a substantial amount of fatty acids. The polyphenyl ether oil used was an isomeric mixture of 5-phenyl ethers predominating in m-bis(m-phenoxyphenoxy)benzene. The acid additive used was a carboxylic acid derivative of the base oil mixture prepared as described below and containing an average of 1.2 carboxyl groups per molecule. The tests were conducted at a bulk solder temperature of 700° F. The results were as follows:

Table I

Performance of Various Fluids in High-Temperature Wave Soldering

| Fluid | Useful Life |
|---|---|
| Commercial mineral base wave soldering oil | 2–4 hours |
| Polyphenyl ether (no additive) | 1½–2 hours |
| Polyphenyl ether +0 10%-wt. diacid | >8¼hours |
| Polyphenyl ether +20%-wt. diacid | >11 hours |

These results show that the oils of the invention are far superior to commercially available fluids and to neat polyphenyl ether at high temperatures.

The novel polyphenyl ether carboxylic acids of the invention may be prepared by any known method of preparing carboxylic acids. According to a standard Grignard method, the ether starting materials may be halogenated by reaction with, e.g., bromine, reacted with magnesium, followed by carbonation with, e.g., dry ice. Or the bromide derivative may be reacted with sodium cyanide, end the cyano group is subsequently hydrolyzed to the desired acid. In another method, the starting ether is reacted with phosgene in the presence of $AlCl_3$, and the product is hydrolyzed to the appropriate acid. Acids of the invention may also be prepared by oxidation of alkyl-substituted polyphenyl ethers with a strong oxidizing agent such as permanganate, nitric acid, chromic acid, etc. Preparation of the acid by these methods and others is described in Chapter 13 of Wagner and Zook, Synthetic Organic Chemistry, Wiley and Sons, 1953. The additives used in the above examples were prepared by a modified Grighard technique as explained in the following example.

EXAMPLE

Preparation of Polyphenyl Ether Dicarboxylic Acid

The first step in the synthesis involves formation of a dibromo polyphenyl ether from bromine and an isomeric mixture of unsubstituted 5-phenyl ethers. Polyphenyl ether (669 g., 1.5 moles) was dissolved in 300 cc. of carbon tetrachloride in a 3-liter, three-necked flask equipped with a stirrer, dropping funnel, and condenser. The mixture was heated to 40°–50 C. and 480,g. of bromine were added dropwise. The mixture was stirred and heated for about 10 hours, and the reaction mixture changed from its initial red-orange color to bright yellow. The reaction mixture was cooled, poured into water, and separated. The organic layer was washed with dilute base to remove unreacted $Br_2$ and HBr, and subsequently with water until the spent wash was neutral. The organic layer was dried over $CaSO_4$, yielding an orange syrup containing 25.2 percent bromine. Calculated bromine content is 26.4 percent. The yield based on bromine content is 95.4 percent of theory.

Magnesium turnings (52.2 g., 2.15 moles) were placed in a 5-liter three-necked flask equipped with a stirrer, dropping funnel, condenser fitted with a drying tube, and gas inlet and covered with dry tetrahydrofuran. A solution of 200 g. of polyphenyl ether dibromide prepared above, 162.8 g. of n-propyl bromide, and 200 ml. or dry tetrahydrofuran was prepared, and a few drops of this solution plus a crystal of iodine was used to initiate the reaction. The addition rate was adjusted to maintain gentle reflux. After the addition was completed, the mixture was refluxed for several hours, and then cooled.

Dry $CO_2$ was passed into the reaction vessel with vigorous stirring to carbonate the Grignard reagent; the vessel was externally cooled to remove the heat of reaction. The reaction mixture was filtered through a plug of glass wool to remove any excess magnesium and was then acidified with dilute HCl to liberate free acid. The mixture was diluted with benzene and the layers were separated in a separatory funnel. The benzene layer was washed repeatedly with water to remove butyric acid formed in the reaction. The organic layer was dried and vaccuum-stripped. The residue was a brown glassy material which may be powdered but which sinters to a glass on standing. the product contained 65.3 percent of the theoretical acid number of 210 and contained 1.01 percent residual bromine. It contained an average of about 1.2 acid groups per molecule, with the carboxyl substituents predominantly located on the terminal phenylene groups in the para position.

We claim as our invention:

1. A fluid composition consisting essentially of a major amount of a polyphenyl ether base fluid having the formula:

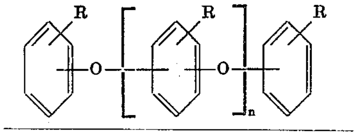

where $n$ is an integer from 2 to about 6 and R is hydrogen or $C_1$–$C_4$ alkyl, and from 1–50 percent by weight of the final composition of a substituted polyphenyl ether or mixture of substituted polyphenyl ethers having the formula:

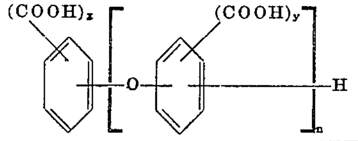

where $n$ is an integer from 2 to 5, $x$ is 0–3, $y$ is 0–3, and the sum of $x$ and $y$ is from 1 to 3.

The composition of claim 1 wherein the polyphenyl ether base fluid has from 5 to 7 unsubstituted aromatic rings per molecule.

3. The composition of claim 2 wherein the substituted polyphenyl ether constituent is present in an amount of 5 to 30 percent by weight 4. The composition of claim 2 wherein the substituted polyphenyl ether constituent is present in an amount of 5 to 30 percent by weight and has two to three carboxyl substituents per molecule.

5. The composition of claim 2 wherein the polyphenyl ether base fluid is an unsubstituted pentaphenyl ether, and the substituted polyphenyl ether constituent has one to three carboxyl substitutents per molecule and is present in an amount of from 5 to 30 percent by weight of the final composition.

* * * * *